(12) United States Patent
Ioku et al.

(10) Patent No.: US 12,215,782 B2
(45) Date of Patent: Feb. 4, 2025

(54) TRANSMISSION

(71) Applicant: KAWASAKI MOTORS, LTD., Hyogo (JP)

(72) Inventors: Yasuyuki Ioku, Akashi (JP); Kazuho Matsumoto, Akashi (JP); Yuji Hida, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/215,942

(22) Filed: Jun. 29, 2023

(65) Prior Publication Data

US 2025/0003486 A1  Jan. 2, 2025

(51) Int. Cl.
| | |
|---|---|
| *F16H 61/30* | (2006.01) |
| *F16H 57/02* | (2012.01) |
| *F16H 57/021* | (2012.01) |
| *F16H 57/031* | (2012.01) |
| *F16H 63/30* | (2006.01) |

(52) U.S. Cl.
CPC ........... *F16H 61/30* (2013.01); *F16H 57/021* (2013.01); *F16H 57/031* (2013.01); *F16H 63/3026* (2013.01); *F16H 2057/02026* (2013.01); *F16H 2057/02056* (2013.01)

(58) Field of Classification Search
CPC ...... F16H 61/30; F16H 57/021; F16H 57/031; F16H 63/3026; F16H 2057/02026; F16H 2057/02056; F16H 2061/308; F16H 61/0009
See application file for complete search history.

(56) References Cited

U.S. PATENT DOCUMENTS

| | | | |
|---|---|---|---|
| 7,946,953 B2 | 5/2011 | Koga et al. | |
| 2018/0372188 A1* | 12/2018 | Hana | F16H 61/0009 |
| 2021/0316607 A1* | 10/2021 | Takahashi | F15B 15/20 |

* cited by examiner

*Primary Examiner* — Terence Boes
(74) *Attorney, Agent, or Firm* — Wenderoth, Lind & Ponack, L.L.P.

(57) ABSTRACT

A transmission includes: a transmission case having a partition wall defining a transmission chamber; a clutch cover that covers the partition wall and forms a clutch chamber adjacent to the transmission chamber with the partition wall interposed therebetween; a plurality of rotating bodies accommodated in the transmission chamber; a clutch that connects and disconnects a drive source output shaft to and from at least one of the rotating bodies, the clutch being accommodated in the clutch chamber; an actuator that is disposed in one of the transmission chamber and the clutch chamber and is driven by a pressure medium to be supplied; and a pressure circuit block that constitutes at least a part of a pressure circuit for applying pressure to the actuator via the pressure medium and is attached to the partition wall.

16 Claims, 9 Drawing Sheets

TRANSMISSION

BACKGROUND OF THE INVENTION

Technical Field

The present disclosure relates to a transmission.

Background Art

U.S. Pat. No. 7,946,953 B2 discloses a transmission case that accommodates a dual clutch transmission (DCT). The transmission includes a plurality of parallel shafts, and the transmission case has a pair of bearing walls that rotatably support both ends of each shaft. In this transmission, a shift change is performed by axially displacing a hydraulically driven shifter. A part of a hydraulic device for displacing the shifter is attached to an upper wall of the transmission case. Therefore, the transmission case is large as a whole.

SUMMARY OF THE INVENTION

An object of the present disclosure is to downsize a transmission case.

One aspect of the present disclosure provides a transmission including: a transmission case having a partition wall that defines a transmission chamber; a clutch cover that covers the partition wall and forms a clutch chamber adjacent to the transmission chamber with the partition wall interposed therebetween; a plurality of rotating bodies accommodated in the transmission chamber, a clutch that connects and disconnects a drive source output shaft to and from at least one of the rotating bodies, the clutch being accommodated in the clutch chamber; an actuator that is disposed in one of the transmission chamber and the clutch chamber and is driven by a pressure medium to be supplied; and a pressure circuit block that constitutes at least a part of a pressure circuit for applying pressure to the actuator via the pressure medium and is attached to the partition wall.

According to the above configuration, at least a part of the pressure circuit for applying pressure to the actuator is attached to the partition wall that partitions the transmission chamber and the clutch chamber. The pressure circuit and the elements driven thereby are collectively arranged in the vicinity of the partition wall, making the casing structure of the transmission compact as a whole.

DETAILED DESCRIPTION

Figure 1:
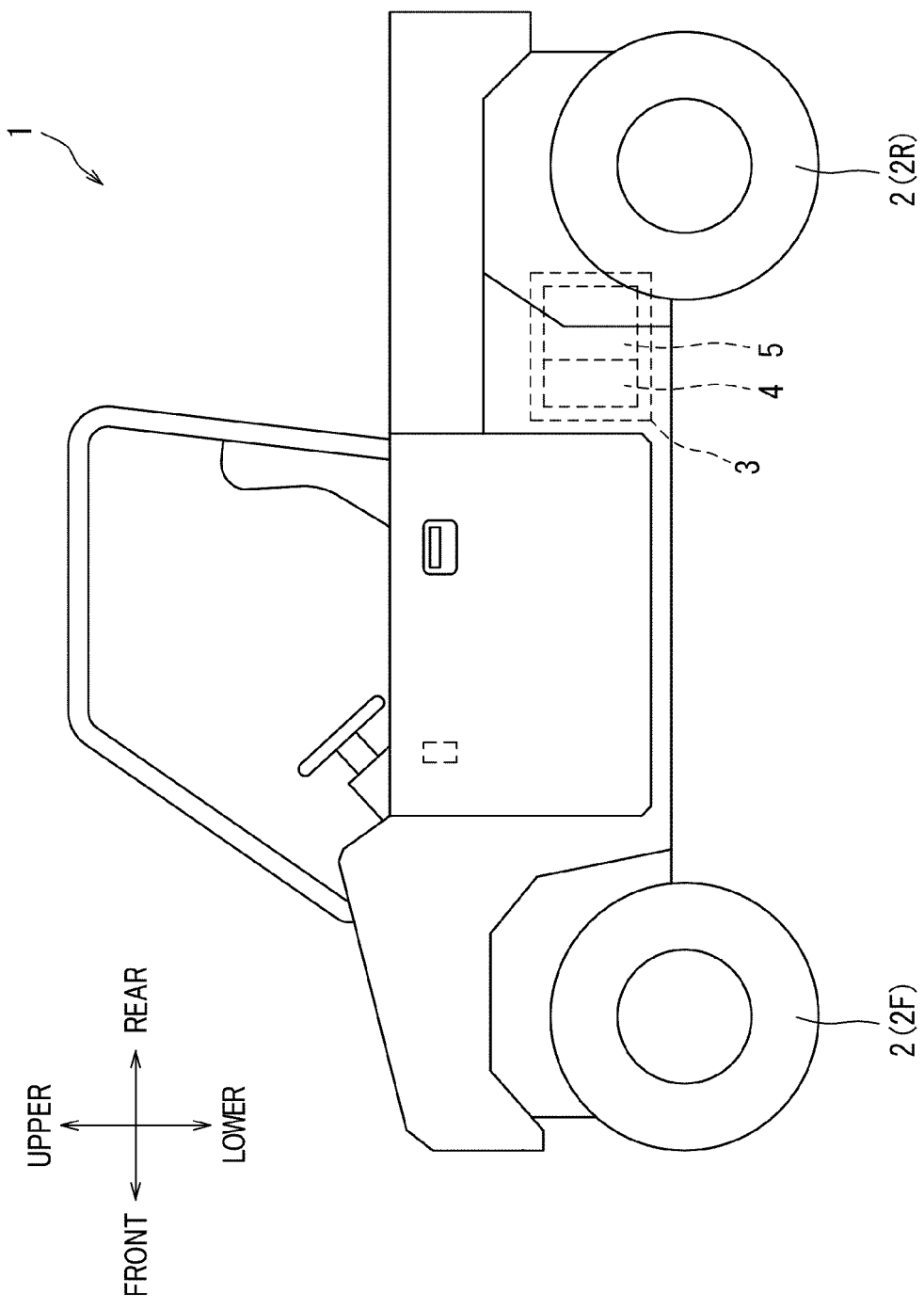
FIG. 1 is a side view of a utility vehicle exemplifying a vehicle equipped with a transmission according to an embodiment.

Hereinafter, an embodiment will be described with reference to the drawings. The same or corresponding elements are denoted by the same reference numerals throughout the drawings, and overlapping of the detailed description will be omitted. The direction is based on a direction viewed from a driver.

FIG. 1 illustrates a utility vehicle 1 as an example of a vehicle equipped with a transmission 10 (see FIG. 2) according to the embodiment. The utility vehicle 1 includes four wheels 2 including left and right front wheels 2F and left and right rear wheels 2R, and a power unit 3 that rotationally drives the wheels 2. The power unit 3 is disposed between the front wheels 2F and the rear wheels 2R in the vehicle length direction.

Figure 2:
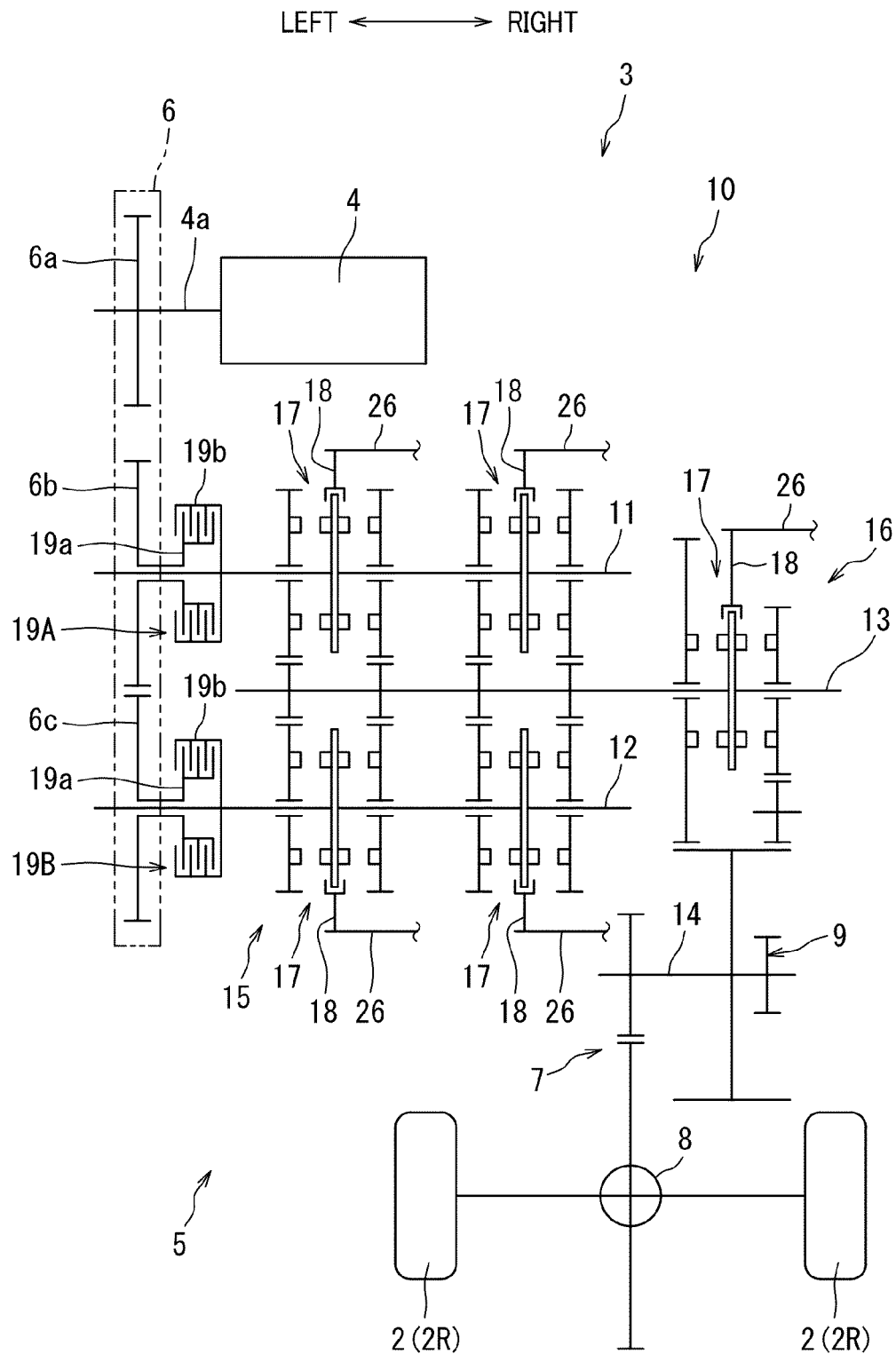
FIG. 2 is a skeleton diagram of the transmission.

Referring to FIG. 2, the power unit 3 includes a drive source 4 and a power transmission mechanism 5. The drive source 4 generates power for rotating the wheels 2 and rotates an output shaft 4a. The drive source 4 is, for example, an engine, and may include an electric motor instead of or in addition to the engine. The power transmission mechanism 5 transmits the rotation output from the drive source 4 to the wheels 2.

The power transmission mechanism 5 includes a primary reduction mechanism 6, a transmission 10, a final reduction mechanism 7, a differential mechanism 8, and a power distribution unit 9. The rotation output from the drive source 4 is input to the transmission 10 via the primary reduction mechanism 6. The transmission 10 shifts and outputs the input rotation. The final reduction mechanism 7 reduces the rotation output from the transmission 10. The differential mechanism 8 transmits the reduced rotation to the left and right rear wheels 2R. The power distribution unit 9 is configured to be able to transmit the rotation output from the transmission 10 to the left and right front wheels 2F.

The transmission 10 is a so-called dual clutch transmission (DCT), and includes two clutches 19A and 19B. The type of the clutches 19A and 19B is not particularly limited, and is, for example, a wet multiple disc clutch driven by hydraulic pressure. The transmission 10 includes a first input shaft 11, a second input shaft 12, a counter shaft 13, and an output shaft 14. These rotating bodies are parallel to each other and extend in the vehicle width direction. The first clutch 19A connects and disconnects the output shaft 4a to and from the first input shaft 11. The second clutch 19B connects and disconnects the output shaft 4a to and from the second input shaft 12.

The primary reduction mechanism 6 includes a driving gear 6a that rotates integrally with the output shaft 4a of the drive source 4, a first driven gear 6b that rotates integrally with an input element 19a of the first clutch 19A, and a second driven gear 6c that rotates integrally with an input element 19a of the second clutch 19B. The driving gear 6a is meshed with the first driven gear 6b and the second driven gear 6c directly or via an idle gear. The rotation of the output shaft 4a is transmitted to the input elements 19a of both the clutches 19A and 19B via the primary reduction mechanism 6. The state of each of the clutches 19A and 19B is switched between an engaged state in which the input element 19a and an output element 19b are engaged with each other and a released state in which the input element 19a and the output element 19b are separated from each other. The output element 19b of the first clutch 19A rotates integrally with the first input shaft 11. The output element 19b of the second clutch 19B rotates integrally with the second input shaft 12. Each of the first and second input shafts 11 and 12 rotates integrally with the corresponding output element 19b unless the corresponding clutches 19A and 19B are in the released state.

The transmission 10 includes a transmission mechanism 1S that transmits the rotation of the first or second input shaft 11 or 12 to the counter shaft 13, and a forward-reverse switching mechanism 16 that switches between a forward state and a reverse state. The transmission mechanism 15 includes a plurality of (for example, eight) gear trains provided between the first or second input shaft 11 or 12 and the counter shaft 13, and these gear ratios are different from each other. Each gear train includes a driving gear provided to the first or second input shaft 11 or 12 so as to be relatively rotatable, and a driven gear provided to the counter shaft 13 so as to be integrally rotatable. The transmission mechanism 15 selects one of the plurality of driving gears and enables the selected driving gear to rotate together with its corresponding input shaft, thereby enabling power transmission through one of the plurality of gear trains. In conjunction with this, the corresponding clutch is brought into an engaged state in order to rotate the input shaft. The forward-reverse switching mechanism 16 is provided between the counter shaft 13 and the output shaft 14, transmits the rotation of the counter shaft 13 to the output shaft 14, and rotates the output shaft 14 in a forward direction or a reverse direction opposite thereto.

The transmission mechanism 15 includes one or more (for example, four in total, two each) dog clutches 17 on each of the first and second input shafts 11 and 12 in order to select one gear train that enables power transmission. The forward-reverse switching mechanism 16 has one dog clutch 17 on the counter shaft 13 to switch between the forward state and the reverse state. Each dog clutch 17 is provided to be integrally rotatable and axially displaceable with respect to the corresponding shaft. The transmission 10 includes a plurality of shift forks 18 corresponding to the dog clutches 17 on a one-to-one basis. Each shift fork 18 axially displaces the corresponding dog clutch 17.

Figure 3:
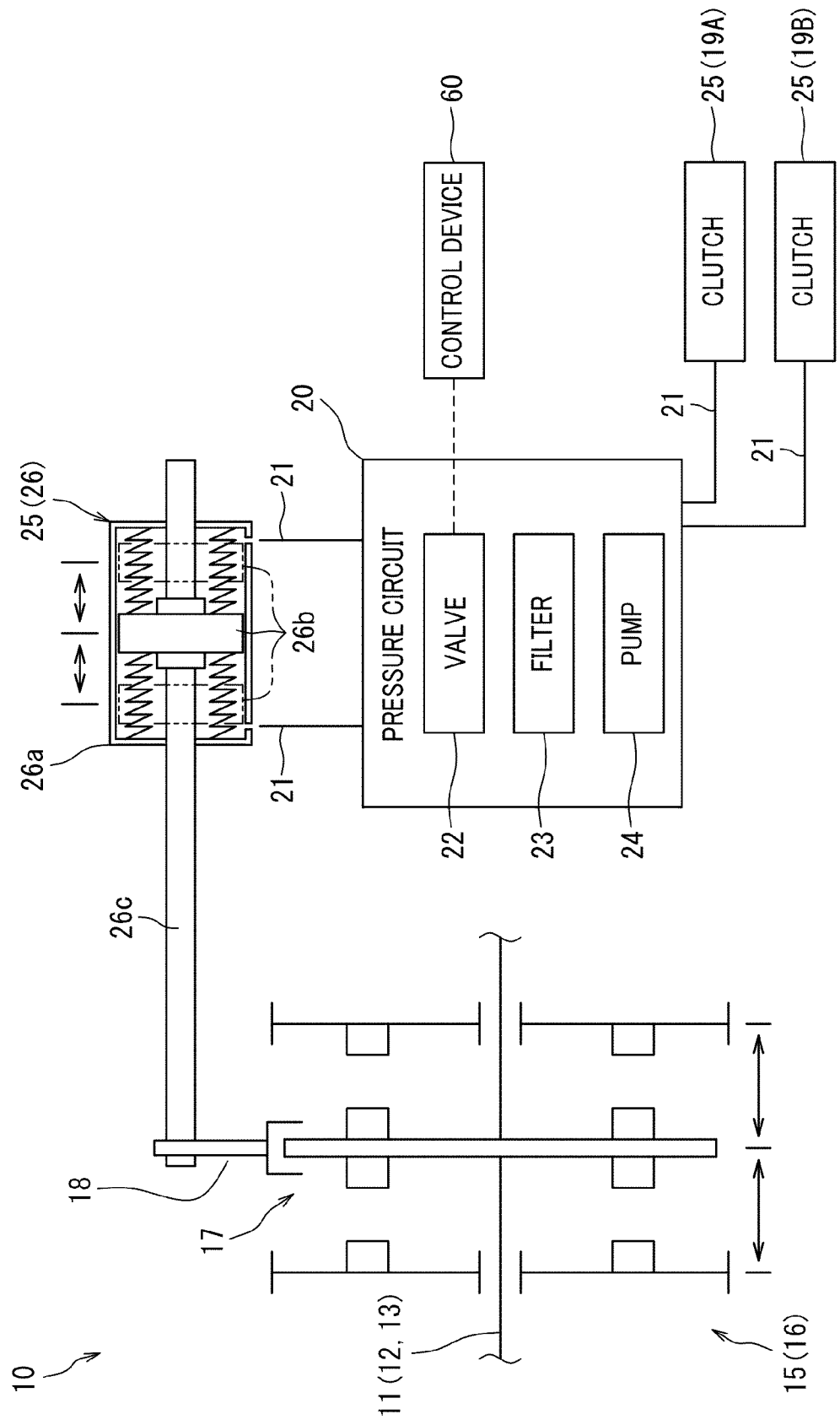
FIG. 3 is a circuit diagram of a hydraulic circuit illustrated as an example of a pressure circuit.

Referring to FIG. 3, the transmission 10 includes an actuator 25 driven by supply of a pressure medium, a pressure circuit 20 for applying pressure to the actuator 25 via a pressure medium, and a control device 60 that controls operation of the pressure circuit 20. In the present embodiment, as a mere example, the pressure medium is hydraulic oil, and the pressure circuit 20 is a hydraulic circuit.

The pressure circuit 20 includes a flow path 21, a valve 22, a filter 23, and a pump 24. The pressure medium flows through the flow path 21. A valve 22 controls supply and discharge of the pressure medium to and from the clutches 19A and 19B and a cylinder 26 as the actuator 25. A filter 23 filters the pressure medium. A pump 24 discharges the pressure medium. The valve 22 is an electromagnetic valve. The control device 60 executes control of whether or not to energize the solenoid of the electromagnetic valve or control of the amount of current energized to the solenoid.

In addition to the first and second clutches 19A and 19B described above, the actuator 25 includes the cylinder 26 that drives the shift fork 18 and thus the dog clutch 17. The first and second clutches 19A and 19B are connected to the pressure circuit 20. The states of the first and second clutches 19A and 19B are controlled by the control device 60 and switched by the pressure circuit 20. The cylinder 26 corresponds to the shift fork 18 on a one-to-one basis. Although FIG. 3 illustrates only one of the plurality of sets of the dog clutch 17, the shift fork 18, and the cylinder 26, the other sets are similarly configured.

The cylinder 26 includes a body 26a, a piston 26b, and a rod 26c. The body 26a has a cylindrical shape. The piston 26b partitions the inside of the body 26a into two oil chambers and is slidable inside the body 26a. The cylinder 26 is a double-acting type, and two ports open to two oil chambers, respectively. The rod 26c extends parallel to the axis on which the dog clutch 17 is provided. The rod 26c is connected to one end surface of the piston 26b at one end, passes through the body 26a, and is connected to the shift fork 18 at the other end.

Figure 4:
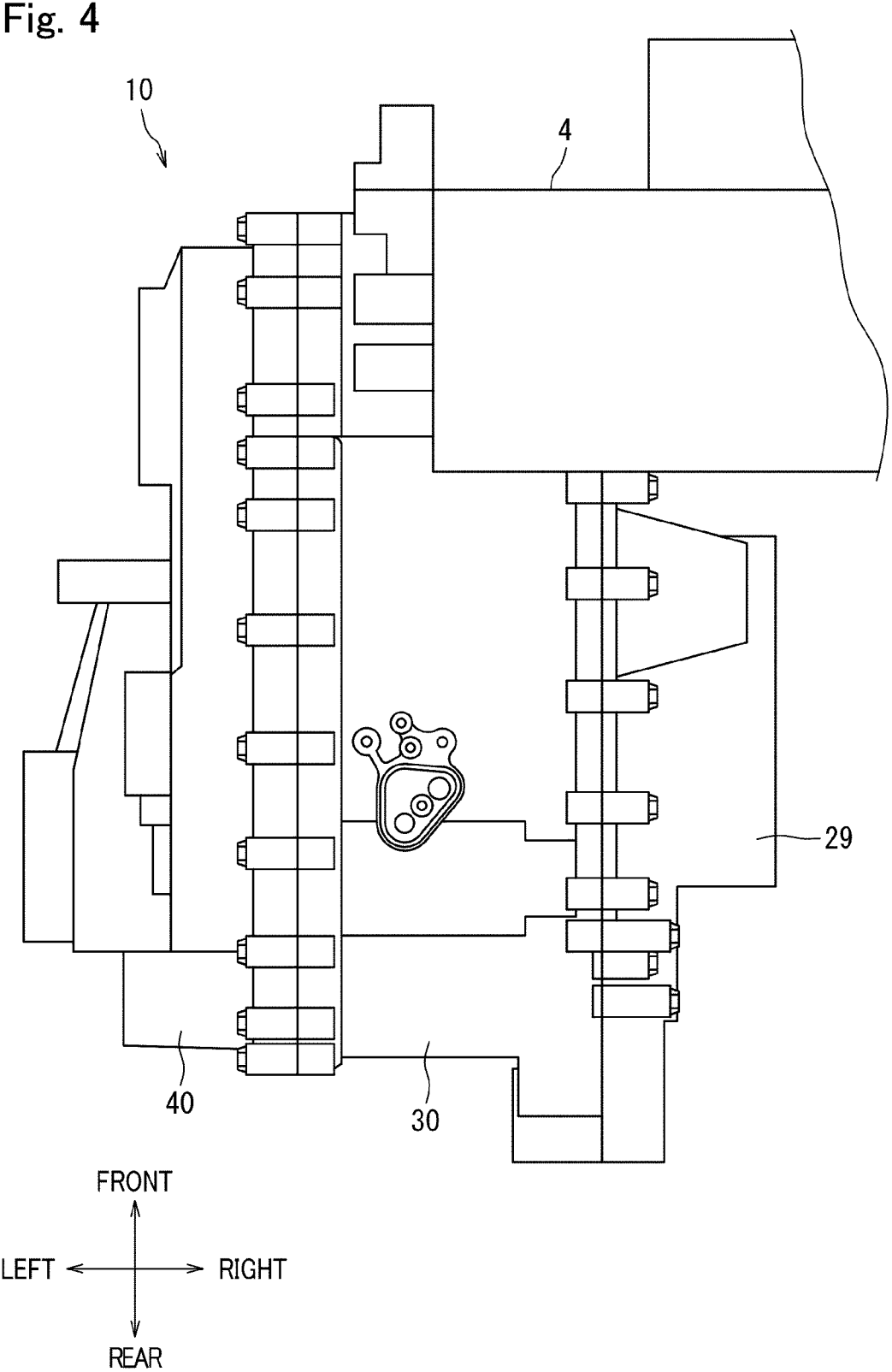
FIG. 4 is a plan view of the transmission.

Referring to FIG. 4, the transmission 10 includes a transmission case 30, a right cover 29, and a clutch cover 40. The right cover 29 covers the transmission case 30 from the right and is fastened to the transmission case 30. The clutch cover 40 covers the transmission case 30 from the left and is fastened to the transmission case 30.

Figure 5:
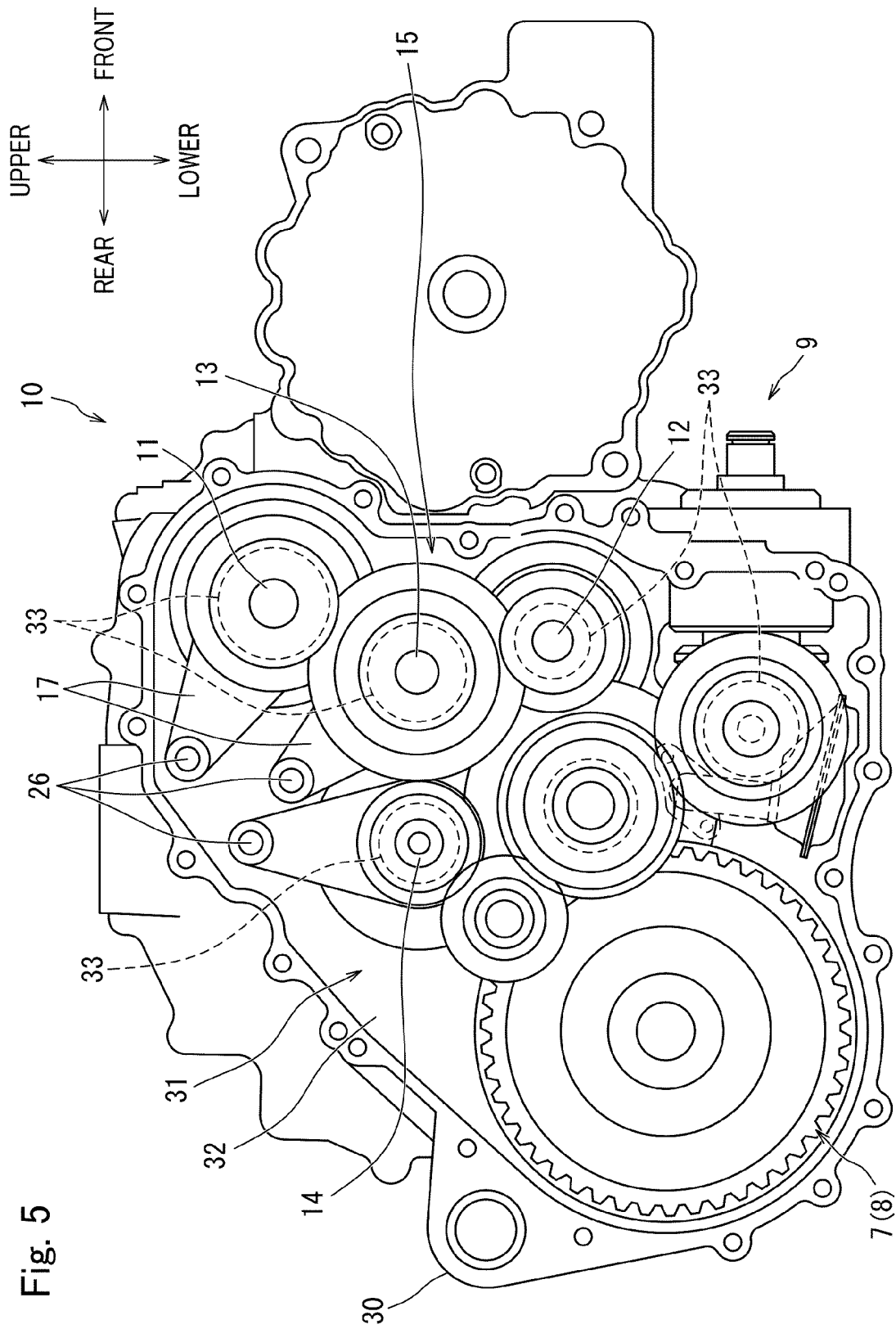
FIG. 5 is a right side view of the transmission in a state where a right cover is removed.

FIG. 5 is a right side view of the transmission case 30 from which the right cover 29 is removed. The transmission case 30 forms a transmission chamber 31. The right side of the transmission chamber 31 is closed by a right cover 29 (see FIG. 4). The left side of the transmission chamber 31 is closed by a partition wall 32 of the transmission case 30. The partition wall 32 is disposed on the left side inside the transmission case 30 and defines the transmission chamber 31.

The transmission chamber 31 accommodates a plurality of rotating bodies such as the first input shaft 11, the second input shaft 12, the counter shaft 13, and the output shaft 14. The transmission chamber 31 further accommodates a plurality of rotating bodies constituting another power transmission mechanism 5, such as the final reduction mechanism 7, the differential mechanism 8, and the power distribution unit 9. The "another power transmission mechanism" is a mechanism other than the transmission 10 in the power transmission mechanism 5, and is particularly a mechanism provided on the downstream side (wheel side) in the power transmission direction as viewed from the transmission 10.

At least one of the rotating bodies (the first input shaft 11, the second input shaft 12, the counter shaft 13, and the output shaft 14) constituting the transmission 10 extends in parallel in the vehicle width direction. The left end of each rotating body is rotatably supported by a bearing 33 held by the partition wall 32. In the present embodiment, all of the first input shaft 11, the second input shaft 12, the counter shaft 13, and the output shaft 14 are supported by the partition wall 32.

Therefore, in assembling the transmission 10, the constantly-meshing transmission mechanism 15 is assembled to the rotating body in advance. Then, in a state where the right cover 29 (see FIG. 4) is removed, the transmission mechanism 15 is inserted into the transmission chamber 31 from the right, and the left end of the rotating body is inserted into the bearing 33 held by the partition wall 32. As a result, most of the assembly of the transmission 10 is completed. The manufacturing efficiency of the transmission 10 and thus the vehicle equipped with the transmission 10 is improved.

Figure 6:
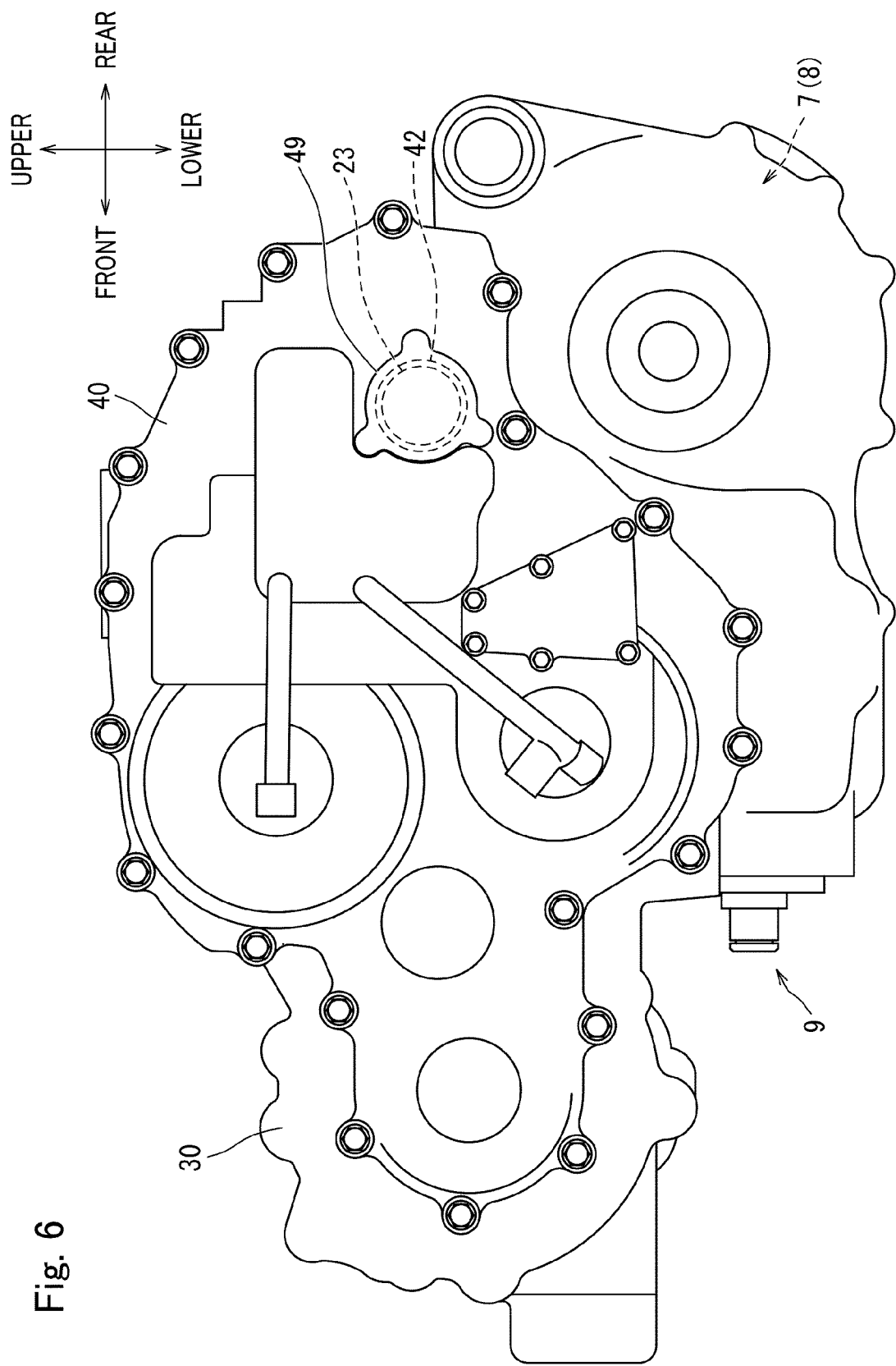
FIG. 6 is a left side view of the transmission.
Figure 7:
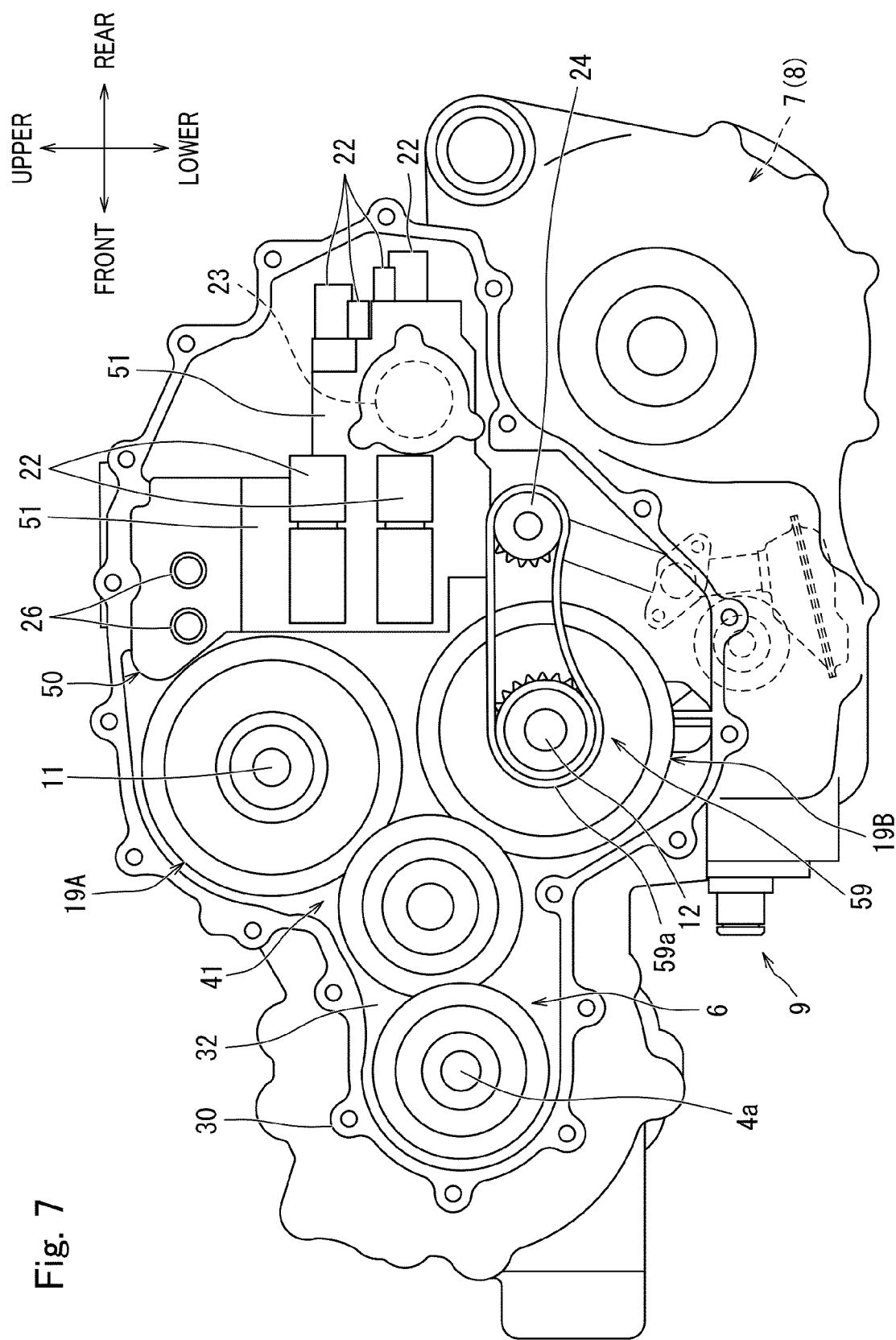
FIG. 7 is a left side view of the transmission in a state where a clutch cover is removed.

FIGS. 6 and 7 are left side views of the transmission 10, FIG. 6 illustrates a state in which the clutch cover 40 is attached, and FIG. 7 illustrates a state in which the clutch cover 40 is removed. The clutch cover 40 covers the partition wall 32 from the left, thereby forming the clutch chamber 41. The clutch chamber 41 is adjacent to the transmission chamber 31 via the partition wall 32. The partition wall 32 partitions the clutch chamber 41 and the transmission chamber 31 in the vehicle width direction, and the clutch chamber 41 is located on the left side with respect to the partition wall 32 with respect to the transmission chamber 31.

Left ends of the first input shaft 11 and the second input shaft 12 protrude from the partition wall 32 into the clutch chamber 41 together with an end of the output shaft 4a of the drive source 4. The first clutch 19A, the second clutch 19B, and the primary reduction mechanism 6 are accommodated in the clutch chamber 41. On the other hand, the cylinder 26 is partially embedded in the partition wall 32, and is partially disposed in the transmission chamber 31 or closer to the transmission chamber 31 than the partition wall 32. The clutches 19A and 19B and the cylinder 26 are an example of the actuator 25. At least a part of the actuator 25 is disposed in the transmission chamber 31. At least a part of the actuator 25 is disposed in the clutch chamber 41.

The transmission 10 further includes a pressure circuit block 50 that constitutes at least a part of the pressure circuit 20 and is attached to the partition wall 32. The pressure circuit block 50 may be attached to an outer surface of the partition wall 32 (that is, the surface on one side in the vehicle width direction or the left side surface) and accommodated in the clutch chamber 41. The pressure circuit block 50 may be attached to an inner surface of the partition wall 32 (that is, the surface on the other side in the vehicle width direction or the right side surface) and accommodated in the transmission chamber 31. In the present embodiment, as illustrated in the drawing, the pressure circuit block 50 is attached to the outer surface on the clutch chamber 41 side and is accommodated in the clutch chamber 41.

Although not illustrated in detail, the pressure circuit block 50 is formed by laminating a plurality of flat plate members in the vehicle width direction. A groove and a through hole are formed in each flat plate member, and the groove and the through hole communicate with each other in the vehicle width direction by lamination to form a flow path 21 (see FIG. 3).

Figure 8:
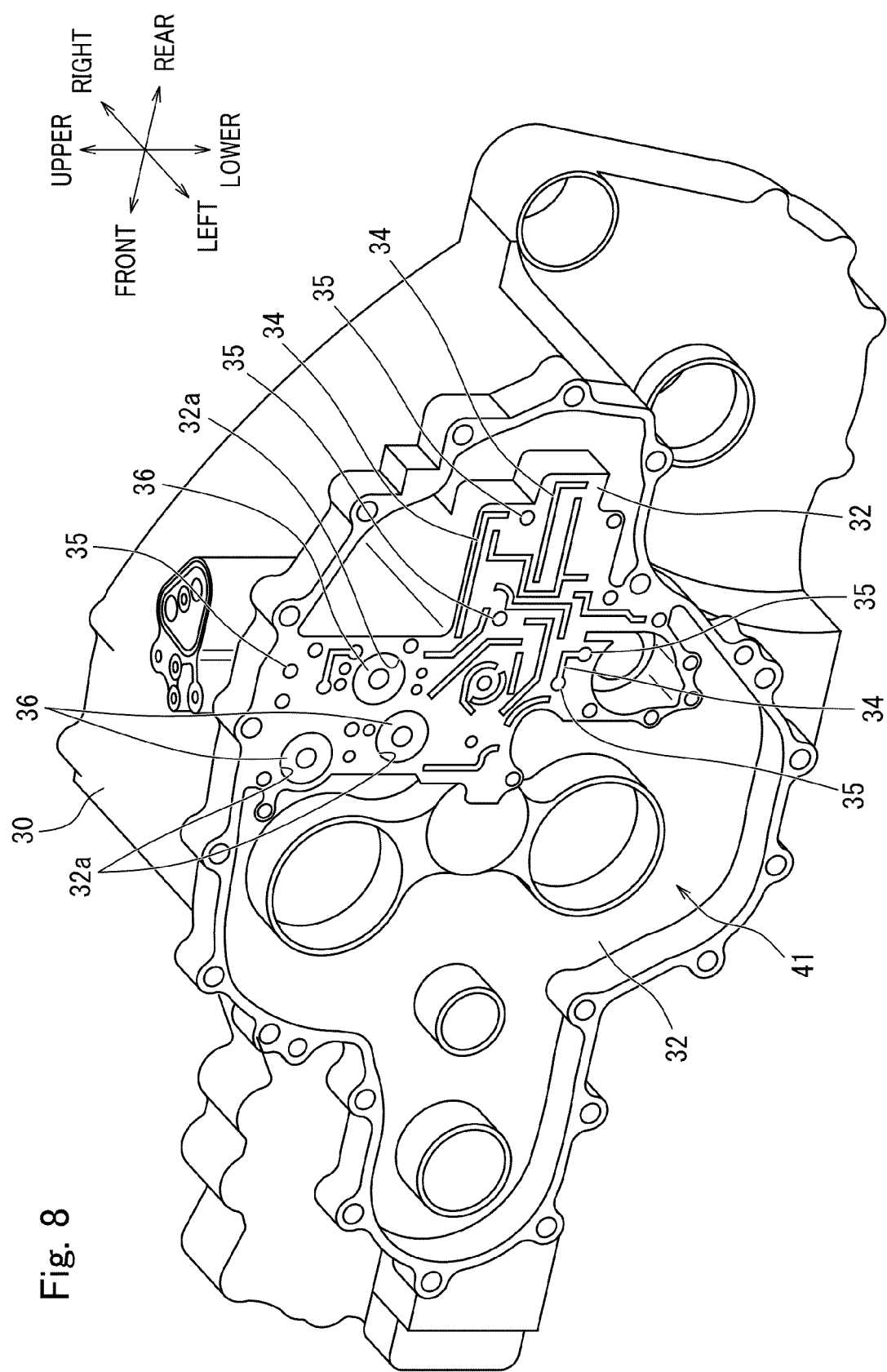
FIG. 8 is a perspective view illustrating a transmission case as viewed from the clutch chamber side.

Referring to FIG. 8, a groove 34 is further formed in an outer surface of the partition wall 32 (a surface to which the pressure circuit block 50 is attached). By fixing the pressure circuit block 50 to the outer surface of the partition wall 32, a part of the flow path 21 of the pressure circuit 20 is constructed with the groove 34. The plate member disposed on the rightmost side among the plate members constituting the pressure circuit block 50 closes the groove 34, thereby forming the flow path 21. In order to prevent leakage of the pressure medium (for example, hydraulic oil) from the groove 34, a gasket may be provided along the outer peripheral edge of the groove 34. The partition wall 32 is provided with one or more through holes 35 that communicate with the groove and penetrate the partition wall 32. As a result, a part of the flow path 21 penetrates the partition wall 32 and extends toward the transmission chamber 31.

The clutches 19A and 19B are disposed in a front part of the clutch chamber 41 and are arranged in the vehicle height direction, and the first clutch 19A is disposed above the second clutch 19B. The pressure circuit block 50 is disposed behind the clutches 19A and 19B in the clutch chamber 41. The pressure circuit block 50 is disposed between the upper edge end of the first clutch 19A and the lower edge end of the second clutch 19B in the vehicle height direction.

Referring to FIG. 7, the clutch chamber 41 accommodates a chain sprocket mechanism 59 that takes out rotation from an input element of the second clutch 19B to drive an auxiliary machine (for example, the pump 24). A chain 59a of the mechanism 59 is fed backward with respect to the second clutch 19B and returns forward with respect to the second clutch 19B, but the pressure circuit block 50 is disposed above the chain 59a.

Referring to FIG. 8, the pressure circuit block 50 includes a valve fixing portion 51 that fixes one or more valves 22 constituting the pressure circuit 20. The valve 22 controls supply and discharge of the pressure medium with respect to the clutches 19A and 19B and the cylinder 26 as the actuator 25.

The filter 23 constituting the pressure circuit 20 is also supported by the pressure circuit block 50. The clutch cover 40 has a maintenance opening 42 (see FIG. 6) formed at a position overlapping with the filter 23 in side view, and the maintenance opening 42 is closed by a lid 49, the maintenance opening 42 being openable. The lid 49 is separate from the clutch cover 40, and may be detachably in close contact with the clutch cover 40, or may be fastened with a bolt or the like.

Figure 9:
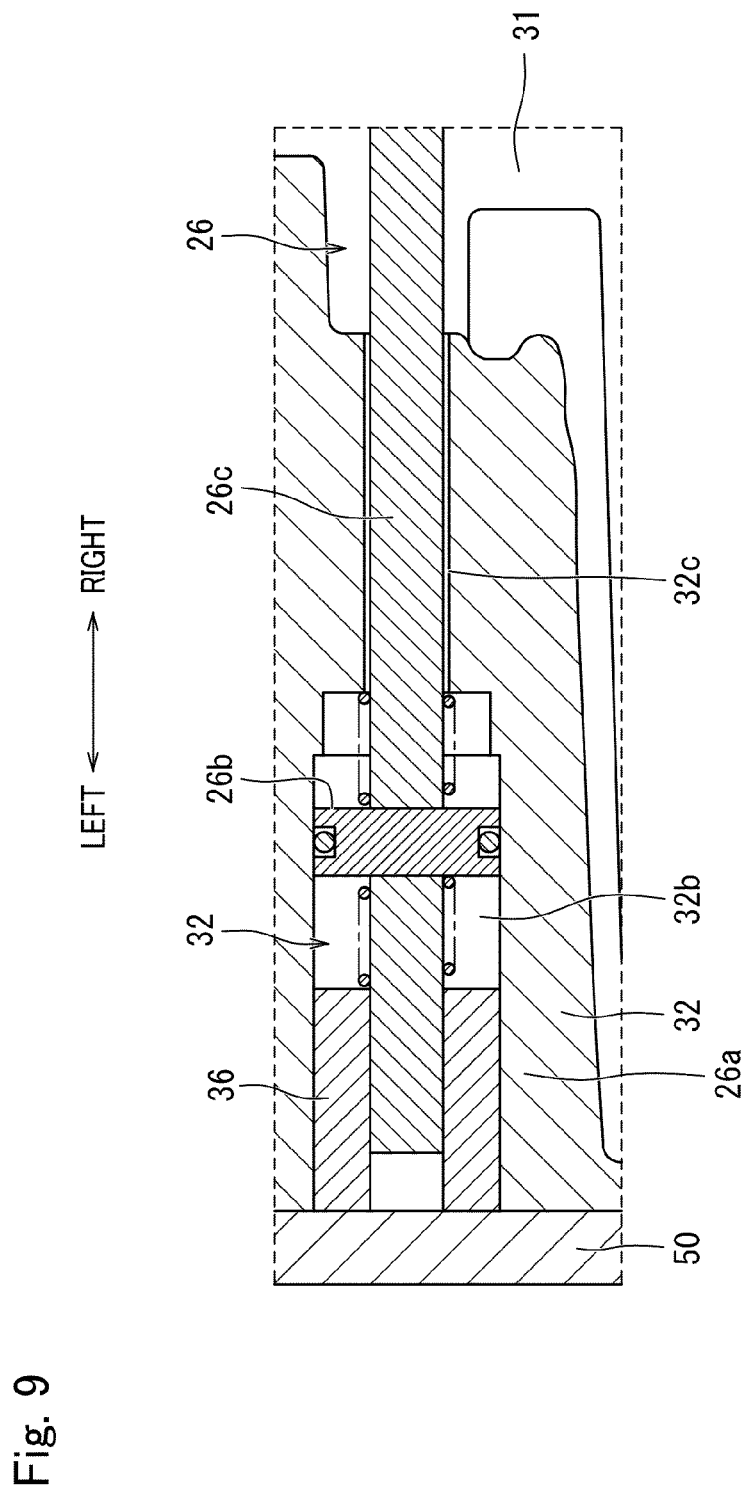
FIG. 9 is a cross-sectional view of a cylinder.

Referring to FIGS. 8 and 9, a through hole 32a is formed in the partition wall 32. A cylindrical member 36 is fitted into the through hole 32a. The through hole 32a forms an internal space of the body 26a of the cylinder 26 on the other side in the vehicle width direction (right side in the drawing sheet of FIG. 9) with respect to the cylindrical member 36. That is, the partition wall 32 integrally constitutes the body 26a of the cylinder 26. In other words, the body 26a of the cylinder 26 is constructed with a part of the partition wall 32. The through hole 32a of the partition wall 32 includes a portion 32b in which the piston 26b is accommodated and a fine hole portion 32c that communicates the portion 32b with the transmission chamber 31, and the rod 26c passes through the fine hole portion 32c. As a result, the rod 26c is partially accommodated in the transmission chamber 31, The rod 26c is connected to the shift fork 18 (see FIG. 3) accommodated together with the transmission mechanism 15 in the transmission chamber 31. In this manner, the body 26a is constituted by the partition wall 32, while the rod 26c partially extends in the transmission chamber 31. At least a part of the cylinder 26 is formed in the partition wall 32, and at least a part of the cylinder 26 is disposed in the transmission chamber 31. The pressure circuit block 50 is disposed so as to cover the cylinder 26.

The transmission 10 having the above configuration includes: the transmission case 30 having the partition wall 32 that defines the transmission chamber 31; the clutch cover 40 that covers the partition wall 32 and forms the clutch chamber 41 adjacent to the transmission chamber 31 with the partition wall 32 interposed therebetween; the plurality of rotating bodies (for example, the first input shaft 11, the second input shaft 12, the counter shaft 13, and the output shaft 14) accommodated in the transmission chamber 31; the clutches 19A and 19B that connect and disconnect with the output shaft 4a of the drive source 4 with at least one of the rotating bodies, the clutches 19A and 19B being accommodated in the clutch chamber 41; the actuator 25 that is disposed in one of the transmission chamber 31 and the clutch chamber 41 and is driven by the pressure medium to be supplied; and the pressure circuit block 50 that constitutes at least a part of the pressure circuit 20 for applying pressure to the actuator 25 via the pressure medium and is attached to the partition wall 32.

According to the above configuration, at least a part of the pressure circuit 20 for applying pressure to the actuator 25 is attached to the partition wall 32 that partitions the transmission chamber 31 and the clutch chamber 41. The pressure circuit 20 and the elements driven thereby are collectively arranged in the vicinity of the partition wall 32, making the casing structure of the transmission 10 compact as a whole.

The pressure circuit block 50 is attached to the surface of the partition wall 32 on the clutch chamber 41 side. Accordingly, the pressure circuit block 50 can be protected by the clutch cover 40. At least a part of the pressure circuit 20 is exposed only by removing the clutch cover 40. The maintenance operation of the pressure circuit 20 can be facilitated.

The pressure circuit block 50 includes the valve fixing portion 51 that fixes the valve 22 constituting the pressure circuit 20. As a result, the pressure circuit block 50 can be attached to the partition wall 32 in a state where the valve 22 is fixed to the valve fixing portion 51. It is easy to realize sub-assembly.

The pressure circuit 20 includes the flow path 21 through which the pressure medium flows. The groove 34 is formed on the surface of the partition wall 32 on the side to which the pressure circuit block 50 is attached. By fixing the pressure circuit block 50 to the surface, a part of the flow path 21 is constructed with the groove 34. As a result, the flow path 21 is constructed only by attaching the pressure circuit block 50 to the partition wall 32. The flow path 21 can be easily formed.

The cylinder 26 is constructed with a part of the partition wall 32. Furthermore, at least a part of the cylinder 26 is formed in the partition wall 32, and at least a part of the cylinder 26 is disposed in the transmission chamber 31. The pressure circuit block. 50 is arranged to cover the cylinder 26. As a result, the flow path 21 to the cylinder 26 is shortened.

A part of the flow path 21 penetrates the partition wall 32. As a result, the actuator 25 (in particular, the cylinder 26) can be arranged on the opposite side in the vehicle width direction with respect to the pressure circuit block 50 and the partition wall 32, and it is easy to secure the arrangement space of each of the pressure circuit block 50 and the cylinder 26. In addition, the flow path to the cylinder 26 is also shortened.

The filter 23 of the pressure circuit 20 is supported by the pressure circuit block 50. For example, the maintainability of the filter 23 is improved as compared with a case where the filter 23 is provided at the bottom of the transmission case 30. In particular, the clutch cover 40 has the maintenance opening 42 formed at a position overlapping with the filter 23 in side view, and the maintenance opening 42 is closed by the lid 49, the maintenance opening 42 being openable. The maintenance operation of the filter 23 can be performed without removing the entire clutch cover 40. The filter 23 is an element particularly requiring maintenance among the components of the pressure circuit 20. Such a maintenance operation of the filter 23 can be further facilitated.

Although the embodiment has been described above, the above configuration can be appropriately changed, added, or deleted within the scope of the gist of the present invention.

The partition wall 32 may be separate from the transmission case 30. The type of the transmission 10 is not limited to the DCT. The transmission 10 may be mounted on a vehicle other than the utility vehicle 1.

What is claimed is:

1. A transmission comprising:
a transmission case having a partition wall that defines a transmission chamber;
a clutch cover that covers the partition wall and forms a clutch chamber adjacent to the transmission chamber with the partition wall interposed therebetween;
a plurality of rotating bodies accommodated in the transmission chamber;
a clutch that connects and disconnects a drive source output shaft to and from at least one of the rotating bodies, the clutch being accommodated in the clutch chamber;
an actuator that is disposed in one of the transmission chamber and the clutch chamber and is driven by a pressure medium to be supplied; and
a pressure circuit block that constitutes at least a part of a pressure circuit for applying pressure to the actuator via the pressure medium and is accommodated in the clutch chamber or the transmission chamber.

2. The transmission according to claim 1, wherein the pressure circuit block is attached to a surface of the partition wall on a side of the clutch chamber.

3. The transmission according to claim 1, wherein the pressure circuit block includes a valve fixing portion that fixes a valve constituting the pressure circuit.

4. The transmission according to claim 1,
wherein the pressure circuit includes a flow path through which the pressure medium flows,
wherein a groove is formed on a surface of the partition wall on a side to which the pressure circuit block is attached, and
wherein, by fixing the pressure circuit block to the surface, a part of the flow path is constructed with the groove.

5. A transmission comprising:
a transmission case having a partition wall that defines a transmission chamber;
a clutch cover that covers the partition wall and forms a clutch chamber adjacent to the transmission chamber with the partition wall interposed therebetween;
a plurality of rotating bodies accommodated in the transmission chamber;
a clutch that connects and disconnects a drive source output shaft to and from at least one of the rotating bodies, the clutch being accommodated in the clutch chamber;
an actuator that is disposed in one of the transmission chamber and the clutch chamber and is driven by a pressure medium to be supplied; and
a pressure circuit block that constitutes at least a part of a pressure circuit for applying pressure to the actuator via the pressure medium and is attached to the partition wall
wherein the actuator includes a cylinder, and
wherein the cylinder is constructed by a part of the partition wall.

6. The transmission according to claim 5,
wherein at least a part of the cylinder is formed on the partition wall, and the at least the part of the cylinder is disposed in the transmission chamber, and
wherein the pressure circuit block is disposed to cover the cylinder.

7. The transmission according to claim 5, wherein a part of the flow path penetrates the partition wall.

8. The transmission according to claim 1, further comprising a bearing that supports the rotating bodies,
wherein the bearing is supported by the partition wall.

9. The transmission according to claim 1,
wherein the pressure circuit includes a filter that filters the pressure medium, and
wherein the filter is supported by the pressure circuit block.

10. A transmission comprising:
a transmission case having a partition wall that defines a transmission chamber;
a clutch cover that covers the partition wall and forms a clutch chamber adjacent to the transmission chamber with the partition wall interposed therebetween;

a plurality of rotating bodies accommodated in the transmission chamber;

a clutch that connects and disconnects a drive source output shaft to and from at least one of the rotating bodies, the clutch being accommodated in the clutch chamber;

an actuator that is disposed in one of the transmission chamber and the clutch chamber and is driven by a pressure medium to be supplied; and a pressure circuit block that constitutes at least a part of a pressure circuit for applying pressure to the actuator via the pressure medium and is attached to the partition wall, wherein the pressure circuit includes a filter that filters the pressure medium, wherein the filter is supported by the pressure circuit block, and wherein the clutch cover has a maintenance opening formed at a position overlapping with the filter in a side view, and the maintenance opening is openably closed by a lid.

11. The transmission according to claim 1, further comprising a power transmission mechanism, wherein the power transmission mechanism is disposed on a downstream side of the transmission in a power transmission direction and is accommodated in the transmission chamber.

12. The transmission according to claim 1, wherein the pressure circuit block is accommodated in the clutch chamber.

13. The transmission according to claim 1, wherein the clutch cover is removably attached to the partition wall, and wherein at least a part of the pressure circuit is exposed when the clutch cover is removed from the partition wall.

14. The transmission according to claim 1, wherein the pressure circuit block is attached to the partition wall interposed between the clutch chamber and the transmission chamber.

15. The transmission according to claim 1, wherein the pressure circuit block is formed by laminating a plurality of flat plate members in a vehicle width direction.

16. The transmission according to claim 1, wherein the clutch is disposed in a front part of the clutch chamber and the pressure circuit block is disposed in a rear part of the clutch chamber.

* * * * *